United States Patent
Schaible

(10) Patent No.: US 12,445,059 B2
(45) Date of Patent: Oct. 14, 2025

(54) SYNCHRONOUS SWITCH DRIVER WITH SWITCHED FILTER

(71) Applicant: Advanced Energy Industries, Inc., Denver, CO (US)

(72) Inventor: Todd Martin Schaible, Orono, MN (US)

(73) Assignee: AES Global Holdings PTE. Ltd., Singapore (SG)

( * ) Notice: Subject to any disclaimer, the term of this patent is extended or adjusted under 35 U.S.C. 154(b) by 295 days.

(21) Appl. No.: 18/187,992

(22) Filed: Mar. 22, 2023

(65) Prior Publication Data

US 2024/0322700 A1    Sep. 26, 2024

(51) Int. Cl.
*H02M 3/335*    (2006.01)
*H02M 1/00*    (2006.01)

(52) U.S. Cl.
CPC ..... *H02M 3/33592* (2013.01); *H02M 1/0006* (2021.05)

(58) Field of Classification Search
CPC .. H02M 3/33592; H02M 1/0006; H02M 3/01; H02M 1/0009
See application file for complete search history.

(56) References Cited

U.S. PATENT DOCUMENTS

| | | | |
|---|---|---|---|
| 2008/0285312 A1 | 11/2008 | Fu et al. | |
| 2018/0301999 A1* | 10/2018 | Moon | H02M 3/33592 |
| 2019/0058398 A1* | 2/2019 | Sharifi | H02M 3/06 |
| 2021/0143742 A1* | 5/2021 | Picard | H02M 3/33592 |
| 2023/0216402 A1* | 7/2023 | Metayer | H02M 1/0006 323/282 |

OTHER PUBLICATIONS

Dianbo Fu et al: "A Novel Driving Scheme for Synchronous Rectifiers in LLC Resonant Converters", IEEE Transactions on Power Electronics, Institute of Electrical and Electronics Engineers, USA, vol. 24, No. 5, 1 May 2009.
International Search Report & Written Opinion for PCT Application No. PCT/US2024020913, mailed Jul. 4, 2024; 11 pages.
Weiyi Feng et al: ; "Digital implementation of driving scheme for synchronous rectification in LLC resonant converter", Energy Conversion Congress and Exposition (ECCE), 2010 IEEE, IEEE, Piscataway, NJ, USA, Sep. 12, 2010

* cited by examiner

*Primary Examiner* — Adolf D Berhane
*Assistant Examiner* — Afework S Demisse

(57) ABSTRACT

A power converter comprises a transformer having a primary winding and a secondary winding, a first switch coupled with the secondary winding, a filter circuit coupled with the first switch and comprising a resistor-capacitor (RC) filter coupled in series with a second switch, and a switch controller. The switch controller is coupled with the first switch and the filter circuit and configured to sense a voltage across the first switch, compare the voltage across the first switch with a voltage threshold, and control a gate of the first switch and a gate of the second switch in response to the comparison of the voltage.

20 Claims, 4 Drawing Sheets

SYNCHRONOUS SWITCH DRIVER WITH SWITCHED FILTER

TECHNICAL FIELD

Aspects of the disclosure relate to power converters and more particularly to synchronous switch control.

BACKGROUND

A power supply typically converts an incoming voltage into a different, output voltage. For example, an alternating current (AC) input voltage may be converted to a direct current (DC) voltage for use by electronic equipment. In another example, a first DC input voltage may be converted to a different DC voltage for use by the electronic equipment.

A power converter may include a transformer having a primary winding coupled to a voltage converter having one or more primary side switches configured to deliver input energy to the primary winding. A secondary winding of the transformer is coupled to output circuitry having one or more secondary side switches and configured to transfer energy inductively provided to the secondary winding to a voltage output. The power converter may be, in one example, an LLC synchronous rectifier converter or LLC resonant converter (LLC converter). Typically, one or more switches of the primary side switches are controlled in correlation with one or more switches of the secondary side switches. In a self-driven scheme, the secondary switches are controlled into their on or conduction modes based on a voltage across the switches. In response to sensing the voltage and comparing the sensed voltage to a turn-on threshold, a switch driver turns the switches on to allow the current transferred across the transformer to flow. The switch driver also turns the switches off after sensing the voltage across the switches and comparing the sensed voltage to a turn-off threshold. However, a parasitic inductance of the secondary switches may reduce efficiency of the power converter due to a parasitic voltage caused by the parasitic inductance to add to or subtract from the voltage across the switch caused by its $R_{ds(on)}$ characteristic. As such, an enhancement to or a delay in turning the switches on and/or off, for example, can be out of synch with the current available at the switch for conduction through the switch. Accordingly, a significant power loss can be experienced.

SUMMARY

In accordance with one aspect of the present disclosure, power converter comprises a transformer having a primary winding and a secondary winding, a first switch coupled with the secondary winding, a filter circuit coupled with the first switch and comprising a resistor-capacitor (RC) filter coupled in series with a second switch, and a switch controller. The switch controller is coupled with the first switch and the filter circuit and configured to sense a voltage across the first switch, compare the voltage across the first switch with a voltage threshold, and control a gate of the first switch and a gate of the second switch in response to the comparison of the voltage.

In accordance with another aspect of the present disclosure, in a method for controlling a power converter having a transformer with a primary winding and a secondary winding, a first switch coupled with the secondary winding, a filter circuit coupled with the first switch and including a resistor-capacitor (RC) filter coupled in series with a second switch, and a switch controller coupled with the first switch and the filter circuit, the method comprises sensing, via the switch controller, a voltage across the first switch, comparing, via the switch controller, the voltage across the first switch with a voltage threshold, and controlling, via the switch controller, a gate of the first switch and a gate of the second switch in response to the comparison of the voltage.

BRIEF DESCRIPTION OF THE DRAWINGS

The drawings illustrate embodiments presently contemplated for carrying out the invention.

In the drawings.

Figure 1:
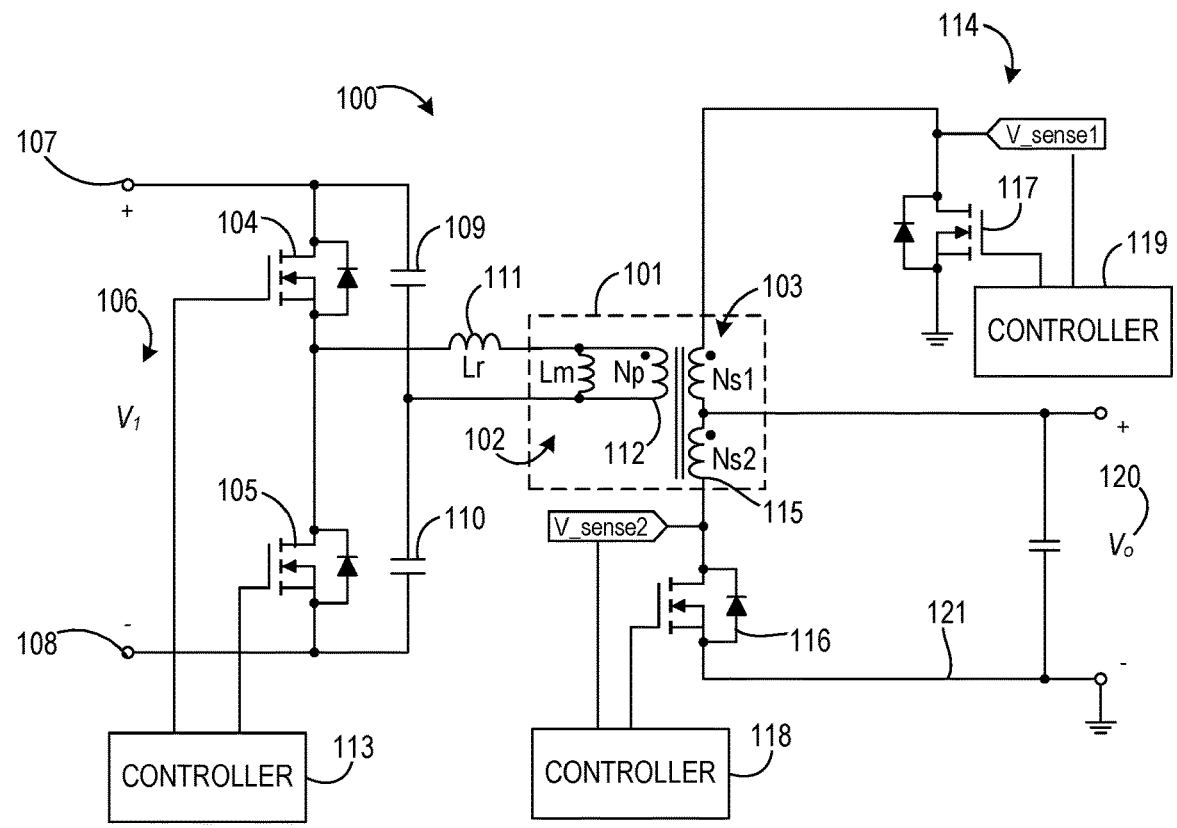
FIG. 1 illustrates a resonant half-bridge LLC converter according to an example.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

FIG. 1 illustrates a circuit diagram for an LLC converter 100 according to an example. As shown, the LLC converter 100 is a resonant half-bridge LLC series converter. Embodiments of this disclosure are also contemplated for other resonant and non-resonant converters that include controlled, secondary side switches such as a full-bridge LLC series converter, half- or full-bridge LCC converters, LC converters, and the like. The LLC converter 100 includes a transformer 101 having a primary side 102 and a secondary side 103. On the primary side 102, two primary side power switches 104-105 are coupled to a voltage input 106 having a pair of input terminals 107-108 and to two capacitors 109-110. A resonant inductor 111 coupled to the power switches 104, 105 and the capacitors 109, 110 is also coupled to a primary winding 112 of the transformer 101. The capacitors 109, 110, inductor 111, and primary winding 112 form a resonant tank for the converter 100. A controller 113 is coupled to the gates of the power switches 104, 105 and is configured to control the switches into alternating on and off (e.g., conducting and non-conducting) modes to deliver at least a portion of a voltage provided to the voltage input 106 to the primary winding 112. The voltage delivered to the primary winding 112 generates a current through the primary winding 112 that inductively induces a corresponding current in the secondary winding 115.

A rectifying circuit 114 is coupled to a secondary winding 115 on the secondary side 103 of the transformer 101. The rectifying circuit 114 is shown as a full-wave rectifier including a pair of synchronous rectifier switches 116-117 coupled to a center-tapped secondary winding (e.g., Ns1, Ns2) of the transformer 101. A multi-controller assembly includes first and second synchronous switch controllers 118, 119 coupled the gates of the synchronous rectifier switches 116, 117 control the conduction modes of the switches 116, 117 to deliver a voltage to the voltage output 120. While separate switch controllers or switch drivers 118, 119 are illustrated, a single dual synchronous rectifier controller with separate control drivers for the synchronous rectifier switches 116, 117 may also be used according to the embodiments described herein.

According to an example, the synchronous switch controllers 118, 119 are self-driven synchronous switch drivers configured to control the gates of the synchronous rectifier switches 116, 117 independently of the primary side controller 113. For example, the controllers 118, 119 are configured to control the synchronous rectifier switch gates without receiving a control signal from the primary switch controller 113 to control the gates. Further, first and second synchronous switch controllers 118, 119 can operate independently of each other. To control the switch 116, the synchronous switch controller 118 receives, as an input, a sensed voltages across the synchronous rectifier switch 116 (e.g., V_sense2). In response a current inductively generated through the secondary winding 115 and out its dotted end, a negative voltage is generated across the synchronous rectifier switch 116 due to conduction of the body diode of the switch 116 in response to current flowing from the signal ground 121 through the body diode toward the secondary winding 115. The negative voltage across the synchronous rectifier switch 116 is provided to the first synchronous switch controller 118 via the V_sense2 signal. A comparison of the negative voltage to a turn-on threshold within the controller 118 determines whether the negative voltage has met or exceeded the turn-on threshold. In response to meeting or exceeding the turn-on threshold, the first synchronous switch driver 118 controls the gate of switch 116 to turn it on, which controls the switch 116 into a conduction mode. While the switch 116 is in the conduction mode, the first synchronous switch controller 118 continues to compare the negative voltage generated in response to an $R_{ds(on)}$ resistance of the switch 116 with a turn-off threshold, Vth. In response to meeting or exceeding the turn-off threshold, the first synchronous switch controller 118 turns the switch 116 off.

Figure 2:
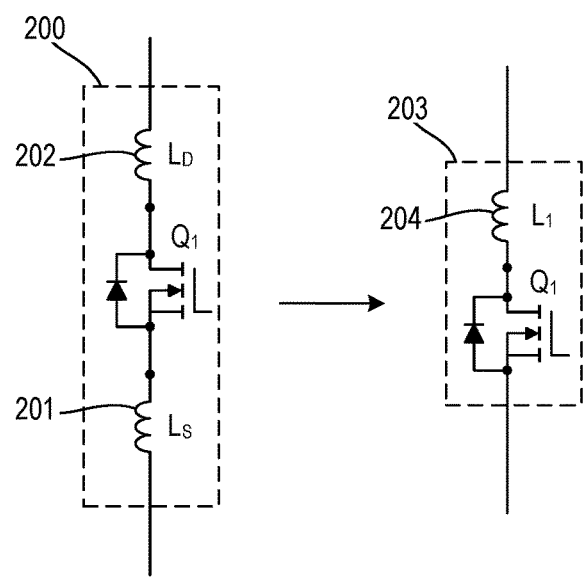
FIG. 2 illustrates a synchronous switch with illustrated internal inductance according to an example.

The synchronous rectifier switches 116, 117 may be manufactured based on desired operation of the switches. For example, the switches 116, 117 may include materials and construction techniques designed to lower the $R_{ds(on)}$ resistance. However, for a low $R_{ds(on)}$ resistance part, other factors such as inductance may take away from ideal operation. FIG. 2 illustrates an example switch package 200 for either synchronous rectifier switch 116 or switch 117 with illustrated internal or parasitic inductance according to an embodiment.

Illustrated within the switch package 200 are representations of a source inductance 201 and a drain inductance 202. While not physical inductors, the construction and behavior of the switch package 200 in response to currents flowing therethrough subject the currents to parasitic inductance effects visualized in the figures herein with circuit symbols as inductors 201, 202 for visual purposes. The figures described below include a simplified switch package 203 combining the two virtual inductances 201, 202 into a single parasitic inductance 204 for illustration purposes.

Figure 3:
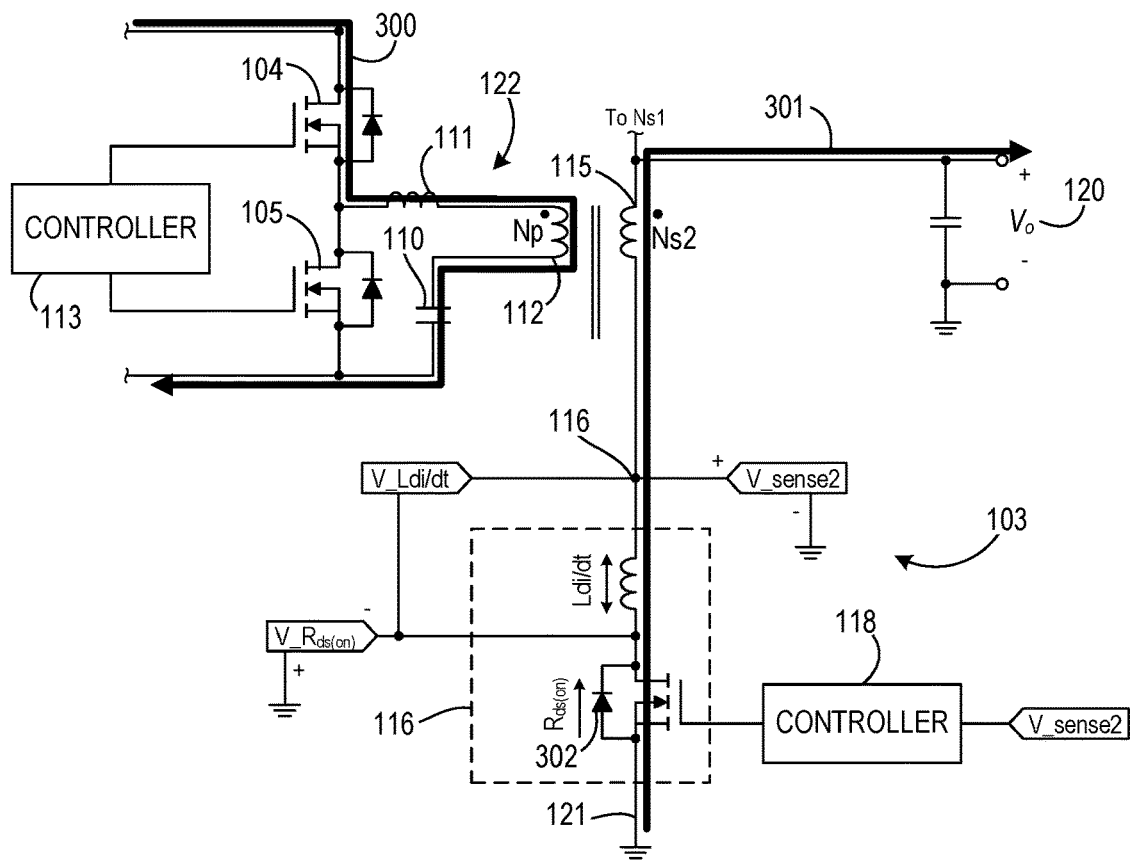
FIG. 3 illustrates a portion of the LLC converter 100 of FIG. 1 according to an example.
Figure 4:
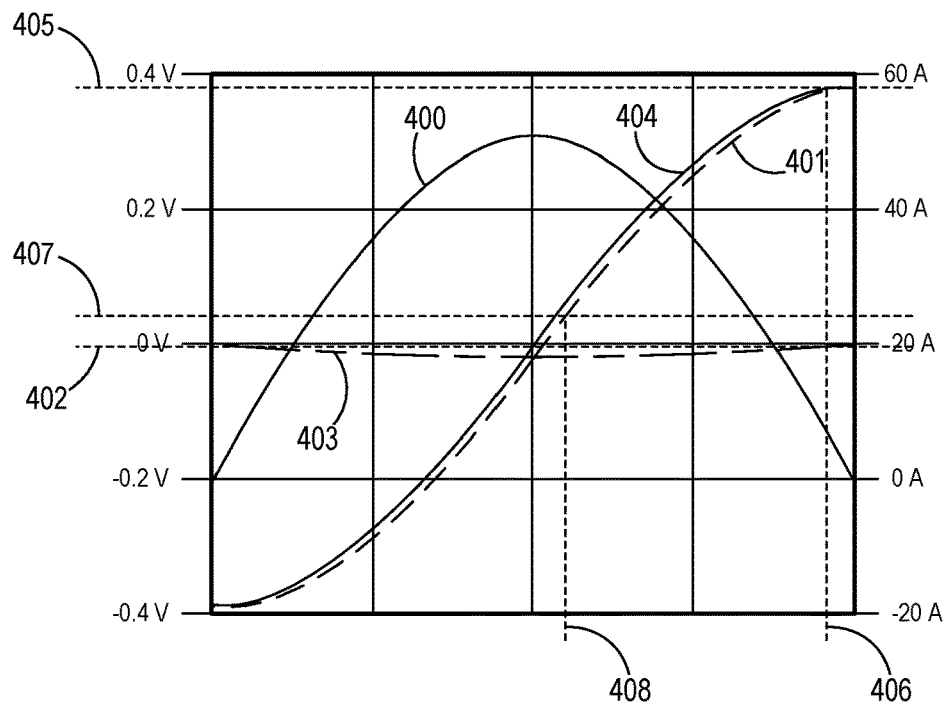
FIG. 4 illustrates a graph showing waveforms corresponding to an exemplary control implementation of the LLC converter 100 based on FIG. 3 according to an example.

FIG. 3 illustrates a portion of the LLC converter 100 of FIG. 1 according to an example. FIG. 4 illustrates a graph showing exemplary waveforms based on a control implementation of the LLC converter 100 using the illustrated circuit portion shown in FIG. 3 according to an embodiment.

Via control of the gate of the power switch 104, the controller 113 controls the power switch 104 into a conduction state, which causes a primary side current 300 to flow through the power switch 104 and resonant tank 122. In response to the primary side current 300 flowing into the dot end of the primary winding 112, a secondary side current 301 flows out of the dot end of the secondary winding Ns2 and on to the voltage output 120.

FIG. 4 illustrates a portion (switch current 400) of the secondary side current 301 flowing through the synchronous rectifier switch 116 according to an example. As the switch current 400 begins to flow, the synchronous rectifier switch 116 is initially in its off or non-conducting state. Accordingly, the switch current 400 begins to flow through the body diode 302, creating a voltage drop that is detectable by the first synchronous switch controller 118 via the sensed voltage signal V_sense2 (signal sensed voltage 401 in FIG. 4). In response to the sensed voltage meeting or exceeding a turn-on threshold 402, the first synchronous switch controller 118 controls the gate of the synchronous rectifier switch 116 to turn the switch on so that the current may flow through the source and drain channel rather than through the body diode 302. A switch voltage 403 ($V\_R_{ds(on)}$) increases in magnitude (that is, it becomes a larger negative value) as the switch current 400 increases. Simultaneously, a package voltage 404 is generated due to the parasitic inductance 204 in the switch 116. After the first synchronous switch controller 118 senses the turn-on voltage and commands the synchronous rectifier switch 116 to turn on, the controller 118 continues to monitor the sense voltage V_sense2 while comparing it to a turn-off threshold 405. As illustrated, the sensed voltage 401 V_sense2 is the sum of the switch voltage 403 and the package voltage 404. The negative value of the switch voltage 403 generates a correspondingly negative offset to the package voltage 404, producing a sensed voltage 401 that follows the package voltage 404 with the negative offset.

As shown, the value of the turn-off threshold 405 can affect an efficiency of the LLC converter 100. For a given load current, a given turn-off threshold value can be optimized to cause the synchronous rectifier switch 116 to be turned off as the switch current 400 reduces close to zero. In the example of FIG. 4, the turn-off threshold 405 can be set to be close to 0.4V such that a comparison 406 causes the first synchronous switch controller 118 to turn the synchronous rectifier switch 116 off. However, if the load current changes to a lower value, the switch current 400 correspondingly changes to a lower value, which can lead to the turn-off threshold 405 not being met before the power switch 104 is turned off by the controller 113. Shoot through, poor efficiency, and Vds stress can result by leaving the synchronous rectifier switch 116 on past the turn off of the power switch 104. In the case of a lower output current, a different turn-off threshold 407 might be better suited to optimize efficiency at the lower output current. However, if the output current raises to that illustrated in FIG. 4, a premature comparison 408 turns the synchronous rectifier switch 116 off, leaving almost half of the current cycle conducting through the body diode 302, resulting in significant loss of efficiency due to the forward drop of the body diode 302.

Figure 5:
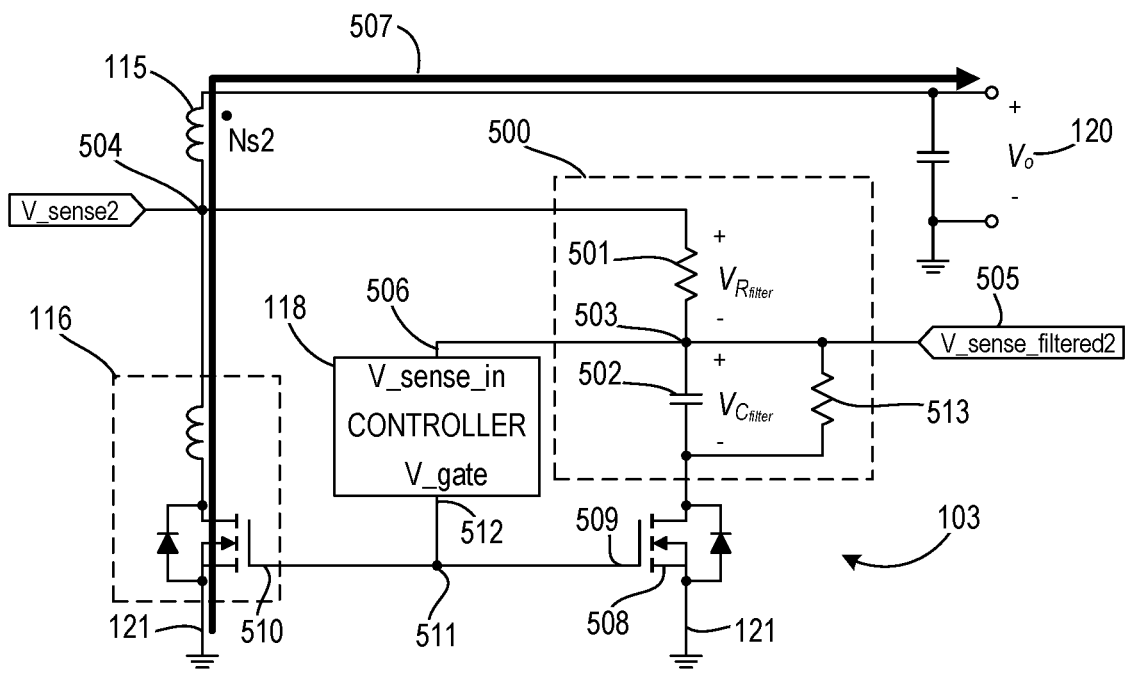
FIG. 5 illustrates a portion of the LLC converter 100 of FIG. 1 including an improved filter according to an example.

FIG. 5 illustrates a portion of the LLC converter 100 that reduces negative effects caused by the package or parasitic inductance of the synchronous rectifier switch 116 according to an example. An RC filter 500 is coupled to the first synchronous switch controller 118 to counter the inductive portion of the first synchronous switch controller 118 caused by the package inductance 204. The RC filter 500 includes a filter resistor 501 coupled in series with a filter capacitor 502 via a common node 503. The filter resistor 501 is coupled with the synchronous rectifier switch 116 via another common node 504. The sensed voltage 401 V_sense2 is coupled with the synchronous rectifier switch 116 via the common node 504 similar to that illustrated in FIG. 3. A filtered sense voltage 505 (V_sense_filtered2) is provided to a sense voltage input 506 (V_sense_in) of the first synchronous switch controller 118 to reduce and optimally nullify the parasitic inductance of the synchronous rectifier switch 116 via the RC filter 500. The resistance and capacitance values of the filter resistor 501 and filter capacitor 502 are chosen so that the product of their impedances is equal to or closely equal to the impedance of the parasitic inductance 204 divided by the resistance of the switch (i.e., $R_{ds(on)}$) as illustrated in the following equations.

$$V_{sense} = i(t) \cdot (R_{ds(on)} + s \cdot L), \quad \text{(Eqn. 1)}$$

where i(t) is the current flowing through the synchronous switch (e.g., secondary side current 507), $R_{ds(on)}$ is the drain-to-source resistance of the synchronous switch in its conduction mode, and sL is the impedance of the parasitic inductance of the synchronous switch.

$$V_{sense\_filtered} = V_{sense} \cdot \frac{\frac{1}{s \cdot C_{filter}}}{\frac{1}{s \cdot C_{filter}} + R_{filter}}, \quad \text{(Eqn. 2)}$$

where $sC_{filter}$ is the impedance of the filter capacitor, $R_{filter}$ is the impedance of the filter resistor, and $s = j2\pi f$.

$$V_{sense\_filtered} = V_{sense} \cdot \frac{1}{1 + s \cdot C_{filtered} R_{filter}}, \quad \text{(Eqn. 3)}$$

$$= \frac{i(t) \cdot (R_{ds(on)} + s \cdot L)}{1 + s \cdot C_{filter} R_{filter}}, \quad \text{(Eqn. 4)}$$

$$= \frac{i(t) \cdot R_{ds(on)} \cdot \left(1 + \frac{s \cdot L}{R_{ds(on)}}\right)}{1 + s \cdot C_{filter} R_{filter}}, \quad \text{(Eqn. 5)}$$

If $$s \cdot C_{filter} R_{filter} = \frac{s \cdot L}{R_{ds(on)}},$$

then $V_{sense\_filtered} = i(t) \cdot R_{ds(on)}$. As such, the filtered sense voltage 505 nullifies all or part of the parasitic inductance of the synchronous rectifier switch 116 sufficient to reduce the effects of the parasitic inductance to a negligible amount.

While the RC filter 500 reduces or eliminates the effects of the parasitic inductance, if coupled directly with the signal ground 121, the filter capacitor 502 could charge to twice the output voltage of the LLC converter 100 during the off time of the synchronous rectifier switch 116. Accordingly, a filter switch 508 is coupled between the RC filter 500 and the signal ground 121 and is turned on via the first synchronous switch controller 118. A gate 509 of the filter switch 508 is coupled with a gate 510 of the synchronous rectifier switch 116 via a common node 511. A gate control signal from a gate control output 512 of the first synchronous switch controller 118 simultaneously controls both switches 116, 508 into the same conduction or non-conduction (e.g., on or off) modes. By turning the filter switch 508 on and off together with the synchronous rectifier switch 116, the inductance nullifying properties of the RC filter 500 can be utilized while avoiding unwanted capacitor charging. The body diode of the filter switch 508 allows the filter capacitor 502 to reset during the off time of the switch 508. In addition, a charge dissipation resistor 513 coupled in parallel with the filter capacitor 502 further facilitates the draining of any stored charge in the filter capacitor 502 during the off time of the switch 508.

Figure 6:
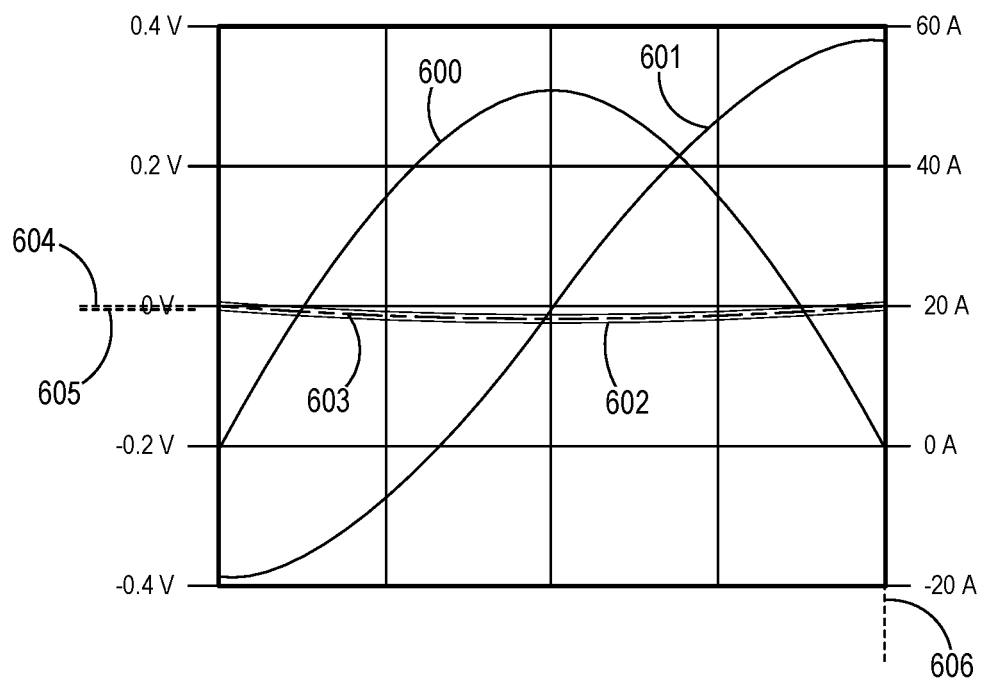
FIG. 6 illustrates a graph showing waveforms corresponding to an exemplary control implementation of the LLC converter 100 based on FIG. 5 according to an example.

FIG. 6 illustrates a portion (switch current 600) of the secondary side current 507 flowing through the synchronous rectifier switch 116 according to an example. FIG. 6 illustrates the nullification effects of the parasitic inductance of the synchronous rectifier switch 116 using the RC filter 500 on a similar current as the switch current 400 illustrated in FIG. 4. FIG. 6 also illustrates a similar package voltage 601 as that shown in FIG. 4. However, due to the nullification effects of the RC filter 500, the sensed voltage 602 is illustrated as closely matching the switch voltage 603. In this manner, a turn-off threshold 604 sufficient to allow most of the current to be used may be set close to the turn-on threshold 605 such that a comparison 606 causes the first synchronous switch controller 118 to turn the synchronous rectifier switch 116 off as the switch current 600 nears its completion in the present cycle.

Figure 7:
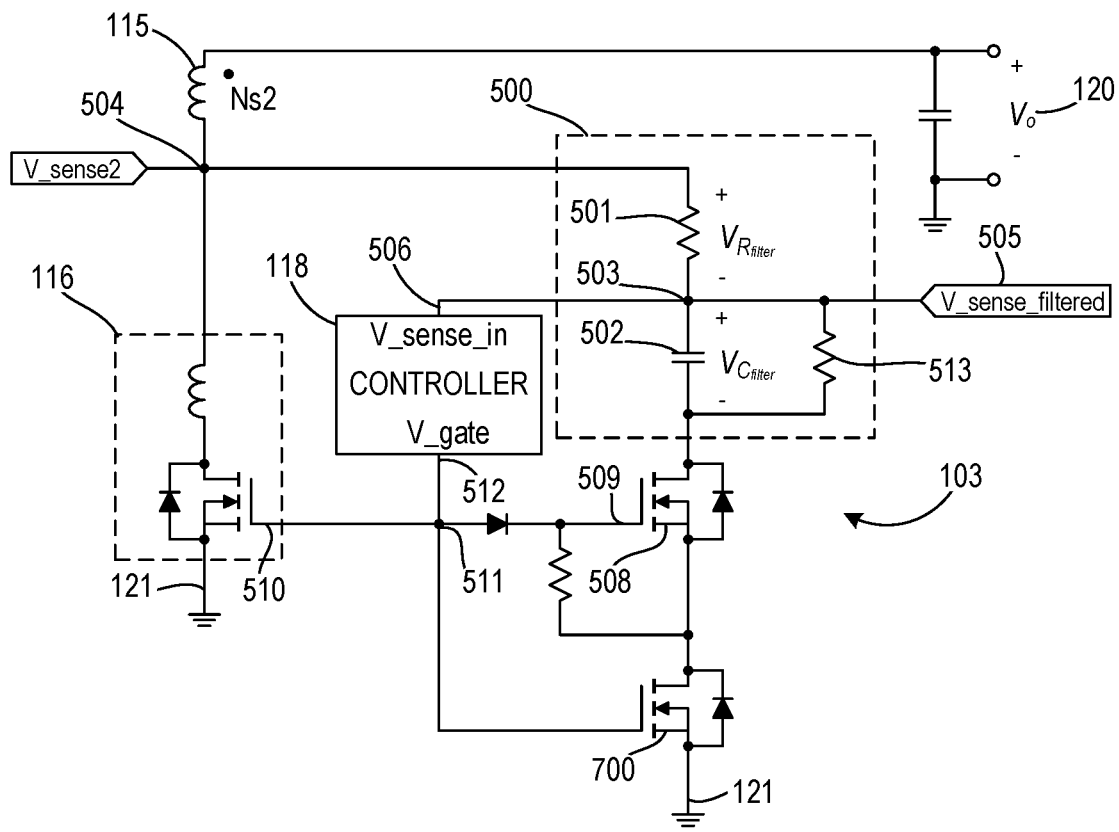
FIG. 7 illustrates a portion of the LLC converter 100 of FIG. 5 according to another example.

FIG. 7 illustrates an embodiment of the LLC circuit portion of FIG. 5 according to another example. In addition to the circuit elements described with respect to FIG. 5, the circuit of FIG. 7 further includes a second filter switch 700 serially coupled with the filter switch 508 between the filter switch 508 and the signal ground 121. The switch 700 is controlled simultaneously or synchronously with the switches 508 and 116. Switch 700 may be included to eliminate or reduce body diode conduction of the body diode of the filter switch 508 during body diode conduction of the synchronous rectifier switch 116.

Figure 8:
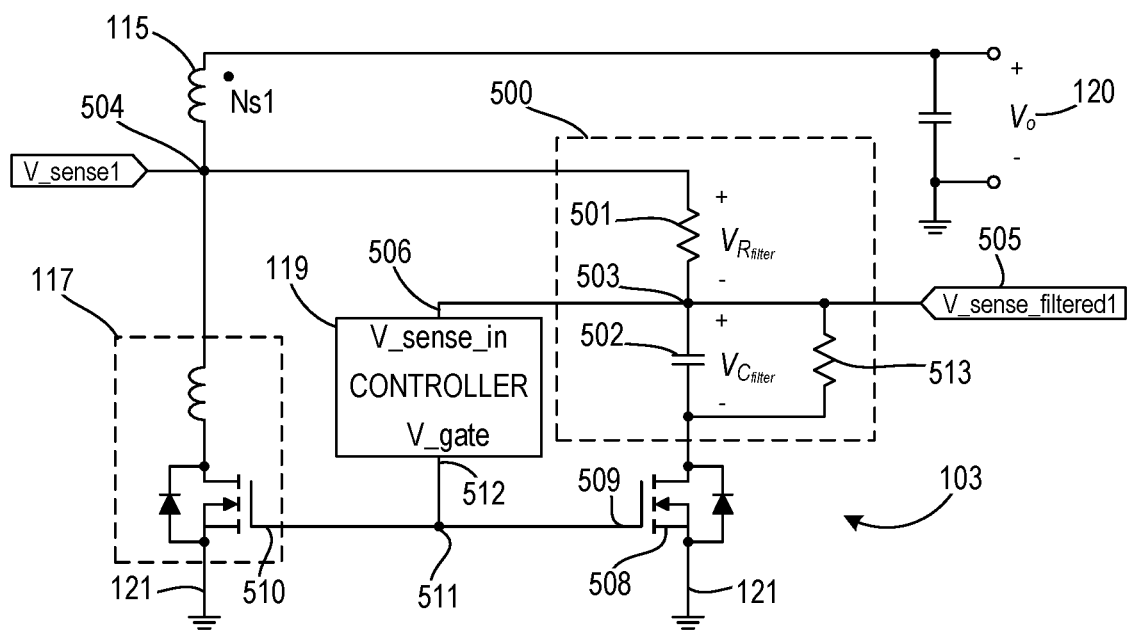
FIG. 8 illustrates a portion of the LLC converter 100 of FIG. 1 including an improved filter according to another example.

FIG. 8 illustrates a portion of the LLC converter 100 of FIG. 1 including an improved filter according to another example. In the circuit diagram of FIG. 8, the synchronous rectifier switch 117 and the second synchronous switch controller 119 are illustrated as being connected to the same circuit as the synchronous rectifier switch 116 and the first synchronous switch controller 118 illustrated in FIG. 5. The description of the RC filter 500 and its benefits for the synchronous rectifier switch 116 and the first synchronous switch controller 118 are applicable to the synchronous rectifier switch 117 and the second synchronous switch controller 119 in a like manner. In one embodiment, both controllers 118, 119 include respective RC filter circuits 500 and filter switches 508 for reducing the parasitic inductance consequences of the synchronous rectifier switches 116, 117. However, due to tolerances in each switch 116, 117, the values of the RC filter components may be individually tailored in each RC filter circuit.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A power converter comprising:
a transformer comprising a primary winding and a secondary winding;
a first switch coupled with the secondary winding;
a filter circuit coupled with the first switch and comprising a resistor-capacitor (RC) filter coupled in series with a second switch, wherein a filter capacitor of the RC filter is coupled between a filter resistor of the RC filter and the second switch; and
a switch controller coupled with the first switch and the filter circuit and configured to:
sense a voltage across the first switch;
compare the voltage across the first switch with a voltage threshold; and
control a gate of the first switch and a gate of the second switch in response to the comparison of the voltage.

2. The power converter of claim 1, wherein the voltage threshold is a turn-on voltage threshold; and
wherein the switch controller, in being configured to control the gate of the first switch and the gate of the second switch, is configured to apply a gate control signal to the gate of the first switch and to the gate of the second switch sufficient to cause the first switch and the second switch to turn on.

3. The power converter of claim 1, wherein the voltage threshold is a turn-off voltage threshold; and
wherein the switch controller, in being configured to control the gate of the first switch and the gate of the second switch, is configured to apply a gate control signal to the gate of the first switch and the gate of the second switch sufficient to cause the first switch and the second switch to turn off.

4. The power converter of claim 1, wherein the first switch is a synchronous switch;
wherein the second switch is a first filter switch;
wherein the filter circuit further comprises a second filter switch coupled in series with the first filter switch; and
wherein the switch controller is further configured to control a gate of the second filter switch synchronously with the gate of the synchronous switch and the gate of the first filter switch to control a conduction mode of the synchronous switch, the first filter switch, and the second filter switch.

5. The power converter of claim 1, wherein the filter resistor is coupled in series with the filter capacitor via a first common node; and
wherein the filter resistor is coupled with the first switch via a second common node.

6. The power converter of claim 1, wherein a product of an impedance value of the filter resistor multiplied with an impedance value of the filter capacitor equals a quotient of an impedance of a parasitic impedance of the first switch divided by a drain-to-source impedance of the first switch in its conduction mode.

7. The power converter of claim 1, wherein the RC filter further comprises a charge dissipation resistor coupled in parallel with the filter capacitor.

8. The power converter of claim 1, wherein the filter circuit and the second switch are coupled in parallel with the first switch.

9. The power converter of claim 1 further comprising a voltage converter coupled with the primary winding and comprising at least one primary side switch configured to control delivery of at least a portion of an input current to the primary winding.

10. The power converter of claim 9, wherein the voltage converter comprises an LLC converter.

11. The power converter of claim 1, wherein the first switch is a first synchronous switch;
wherein the filter circuit is a first filter circuit;
wherein the switch controller is a first switch controller; and
further comprising:
a second synchronous switch coupled with the secondary winding;
a second filter circuit coupled with the second synchronous switch and comprising an RC filter coupled in series with a filter switch; and
a second switch controller coupled with the second synchronous switch and with the second filter circuit and configured to:
sense a voltage across the second synchronous switch;
compare the voltage across the second synchronous switch with the voltage threshold; and
control the second synchronous switch and the filter switch of the second filter circuit in response to the comparison of the voltage across the second synchronous switch.

12. A method for controlling a power converter having a transformer with a primary winding and a secondary winding, a first switch coupled with the secondary winding, a filter circuit coupled with the first switch and including a resistor-capacitor (RC) filter having a filter capacitor coupled in series between a filter resistor and a second switch, and a switch controller coupled with the first switch and the filter circuit, the method comprising:

sensing, via the switch controller, a voltage across the first switch;

comparing, via the switch controller, the voltage across the first switch with a voltage threshold; and controlling, via the switch controller, a gate of the first switch and a gate of the second switch in response to the comparison of the voltage.

13. The method of claim 12, wherein comparing comprises comparing the voltage across the first switch with a turn-on voltage threshold, and wherein controlling comprises controlling the gate of the first switch and the gate of the second switch to turn on.

14. The method of claim 13, further comprising:

comparing, via the switch controller, the voltage across the first switch with a turn-off voltage threshold; and controlling, via the switch controller, the gate of the first switch and the gate of the second switch to turn off in response to the comparison of the voltage across the first switch with the turn off voltage threshold.

15. The method of claim 12, wherein the second switch is a first filter switch;

wherein the filter circuit further includes a second filter switch; and wherein controlling further comprises a gate of the second filter switch synchronously with the gate of the first filter switch.

16. The method of claim 15, wherein the first filter switch and the second filter switch are coupled in series between the filter circuit and a signal ground.

17. The method of claim 12 further comprising:

inducing a current in the secondary winding via the primary winding; and generating the voltage across the first switch via the current.

18. The method of claim 17 further comprising generating a current in the primary winding;

wherein the current in the primary winding induces the current in the secondary winding.

19. The method of claim 18, wherein the power converter further has an LLC voltage converter; and wherein the primary winding forms part of a resonant tank of the LLC voltage converter.

20. The method of claim 19, wherein the LLC voltage converter comprises:

a primary switch; and a primary switch controller configured to control a conduction mode of the primary switch;

wherein the switch controller is a synchronous switch controller and is configured to control the gates of the first switch and the second switch without receiving a control signal from the primary switch controller to control the gates.

\* \* \* \* \*